Patented June 25, 1940

2,205,609

UNITED STATES PATENT OFFICE 2,205,609

MANUFACTURE OF SILICATE-CLAY SUSPENSIONS

James G. Vail, Media, and Chester Leon Baker, Penn Wynne, Pa., assignors to Philadelphia Quartz Company, Philadelphia, Pa., a corporation of Pennsylvania No Drawing. Application January 30, 1936, Serial No. 61,633

4 Claims. (Cl. 255—1)

This invention relates to manufacture of silicate-clay suspensions; and it includes a process of making stable clay suspensions which comprises mixing a clay with an aqueous medium, deflocculating it therein by the use of a small amount of an alkali metal silicate and then adding an alkali metal silicate in proportions normally producing a flocculating or precipitating action upon said suspension, other electrolytes being added to the resulting suspension if desired; all as more fully hereinafter set forth and as claimed.

Many methods have been suggested in the art for the production of suspensions. In many commercial applications suspensions are required which contain electrolytes or other precipitating agents, these agents tending to render such suspensions unstable. The art has heretofore had no entirely satisfactory method of producing stable suspensions containing such agents. The method most commonly used in the production of this type of suspension has included the use of prolonged grinding and mixing, usually in one of the so-called colloid mills.

We have found an extremely simple and effective method of producing stable suspensions of clay which requires a minimum of grinding or other mixing and which is capable of producing suspensions having substantial stability even though containing high concentrations of agents which normally would produce precipitation. Our method includes the steps of mixing a clay with a liquid vehicle substantially free from agents producing a flocculating effect and deflocculating or dispersing the mixture, by adding a small amount of an alkali metal silicate as a peptizing agent. A soluble alkali metal silicate is then added in proportions sufficient to produce a substantial increase in viscosity and sufficient to produce normally a precipitating action upon the resulting suspension, this precipitating action being rendered substantially ineffective by the procedure employed in making the suspension.

Our method makes it possible to obtain clay suspensions having a wide range of physical characteristics with the use of a smaller amount of clay than would otherwise be required. This offers distinct commercial advantages. First it permits a saving in the cost of the clay required. Second it results in more desirable physical characteristics of the products, since the clay content can be adapted to the particular use to which the product is to be put. Third it results in smoother mixtures. Fourth it may in some cases permit the use of less expensive mixing machinery or the consumption of less power than would otherwise be required.

In our method an alkali metal silicate is preferably used as a peptizing agent during the deflocculating step. Concentrations of the order of from 0.1 to 10.0 per cent by weight of sodium silicate, for example, form highly effective peptizing agents. When the clay is sufficiently finely divided, grinding is not required.

To illustrate the use of sodium silicate as a deflocculating agent in the present invention, two experiments will be described.

OUR METHOD

In one experiment we added to 480 parts of water 0.5 part of a sodium silicate solution containing approximately 8.9 per cent $Na_2O$ and 28.5 per cent $SiO_2$. When this was well mixed, 40 parts of California bentonite were added and the mixture was rotated in a ball mill for 24 hours to produce deflocculation. A further addition of 476 parts of the same silicate of soda solution was then made and rotation was continued for another 24 hours. The properties of the resulting suspension were then found to be as follows:

Viscosity_____centipoises__ 16.0
Gel strength_____units__ 40
Supernatant liquor after 24 hrs. settling_____per cent__ 3

CONVENTIONAL METHOD

A mixture made up from the same ingredients and rotated for the same length of time, but in which all the silicate of soda was added to the water before the clay, had the following characteristics:

Viscosity_____centipoises__ 5.5
Gel strength_____units__ 10.0
Supernatant liquor after 24 hrs__per cent__ 47

The improved results, obtained by use of the dilute silicate solution as a peptizing agent, are readily apparent from the above figures.

It is evident that our method has a wide range of utility in the production of various commercial clay suspensions. Our invention is useful in the making of adhesives, cosmetics, enamel slips, water paints and in the production of drilling fluids for oil wells, for example. Many other industrial applications will be evident to those skilled in the art from a consideration of the following specific examples which will further illustrate how our invention may be applied in practice.

Example 1.—A silicate-clay adhesive

In making up an adhesive from clay and sodium silicate solution, in accordance with our process, we took 10,000 parts of water and added 10 parts of a solution of silicate of soda containing 8.9 per cent $Na_2O$ and 28.6 per cent $SiO_2$. Then 15,000 parts of finely ground suprex clay (a high-grade plastic clay) were added and thoroughly mixed in to deflocculate the clay. This mixture was paste-like in consistency. Next 59,985 parts of the same silicate of soda solution were added and mixed in. The clay dispersion appeared to coagulate at first but upon continued agitation was found to form a smooth homogeneous mixture that did not settle out or change in viscosity during storage. The physical properties of the resulting adhesive were found to be as follows:

Viscosity _____centipoises__ 71
Gel strength _____units__ 28
Supernatant liquor after 24 hrs. standing__ None
Specific gravity _____ 1.41

The excellent properties of the adhesive produced as above may be compared with the usual commercial adhesive which is made up by prior art methods. One adhesive which is now employed in large commercial quantities is made from the same materials as those used in the above example in the proportions of 60 parts of silicate of soda solution, 25 parts of clay and 15 parts of water. This adhesive is usually prepared by first mixing the silicate of soda solution and the water together and then adding the clay. This mixture settles so rapidly that ordinarily it must be kept under mechanical agitation until used. This same tendency to settle prevents it from being shipped any great distance. Furthermore there is a tendency for its viscosity to change with time so that once this property has been adjusted, the mixture must be used fairly promptly. These unfavorable properties of this adhesive require that it be made up in daily batches at the location where it is to be used. Thus it has heretofore been necessary to set up mixing machinery at each place of use instead of having a centrally located mixing plant involving a smaller total expenditure.

Silicate-clay adhesives of the type described should have a viscosity greater than about 40 centipoises and should not settle more than 50 per cent of clear supernatant liquor upon 24 hours standing, that is, the suspensions should be substantially stable. The gel strength of such adhesives may be as low as zero. It is obvious from the results given in the preceding discussion that clay suspensions having these properties may be obtained by the methods of the present invention over a much larger range of composition than is possible with prior art methods.

The use of our method has overcome the disadvantages of the prior art method in the preparation of silicate-clay adhesives. Furthermore, a satisfactory adhesive can be made as above with 15 parts of clay instead of the 25 parts formerly required. An important saving in clay is therefore effected.

Example 2.—Oil well drilling fluid

In making a suspension suitable for use as an oil well drilling fluid, we dissolved in 100,000 parts of water 100 parts of sodium tannate. Then 15,300 parts of previously dried and ground bentonitic clay from West Texas were added and thoroughly mixed with the solution. This mixture had a cream-like consistency. Next 140,000 parts of a silicate of soda solution containing 8.9 per cent of $Na_2O$ and 28.5 per cent of $SiO_2$ were admixed. The resulting suspension was found to have characteristics adapting it for use as an oil well drilling fluid, this suspension having the following physical properties:

Viscosity _____centipoises__ 15
Gel strength _____units__ 20
Supernatant liquor after 24 hrs. standing__ None
Specific gravity _____ 1.24

Our method appears to be peculiarly adapted to the production of oil well drilling fluids. As is well known, oil well drilling fluids must possess highly specific properties in respect to viscosity, gel strength, the property of thixotropy, flocculating action, flexibility in so far as control of weight per unit of volume is concerned, etc. Our process provides a highly advantageous method of obtaining these desired properties. Our drilling muds can be weighted by the addition of iron oxide and barytes, for example. Various electrolytes can be added, even in high concentrations. Various values of gel strength and viscosity can be realized. The proportion of colloidal clay in the fluids can be varied much more widely than is possible in prior art methods.

High concentrations of electrolytes in drilling fluids are employed to produce a flocculating action upon any colloidal clays with which they may come in contact. The so-called heaving shale which frequently produces difficulties in the drilling of oil wells, is probably a bentonitic-type clay. At least it has been found that a high concentration of electrolytes in drilling fluids tend to eliminate difficulties from this source. Examples of electrolytes which may be added to our suspensions and which are frequently desired in drilling fluids are sodium chloride, sodium phosphate, sodium hydroxide, etc. Any additional electrolytes added should, of course, be compatible with the alkali metal silicate used in our drilling fluids.

By use of our method, drilling fluids can be made, having a considerably higher viscosity, gel strength and stability, with the same proportions of colloidal clay, or having substantially the same properties but containing considerably less clay. A saving of up to 50 per cent in the amount of clay used can be effected. And, since the clay usually constitutes one of the most important cost items in the making of drilling fluids a substantial saving can be realized.

Clay suspensions made by our method can be distinguished from prior art suspensions by their higher viscosity and gel strength. These suspensions will be found to have viscosities and gel strengths, for example, of at least about 50 per cent and sometimes several hundred per cent above the corresponding viscosities and gel strengths of simple admixtures of the ingredients made by usual methods, wherein the clays are mixed with electrolytes without previous deflocculation. These viscosity and gel strength increments are highly important commercially. It will also be found that our suspensions have a greater stability than prior art suspensions, this increased stability being especially noticeable in the case of those suspensions which are on the border line between stability and instability.

Whereas with viscosity and gel strength the differences produced by our method increase in magnitude with an increasing percentage of clay, the differences in settling decrease in magnitude. For this reason the increased viscosity and gel strength are probably more characteristic of our suspensions than the increased stability as measured by the settling test.

The values of gel strength referred to herein are determined by filling the cup of a Stormer viscometer with the clay suspension. The suspension is allowed to stand for 10 minutes and then the minimum weight is determined which is required to start motion of the rotor. This weight, expressed in grams, is taken as the measure of the gel strength. The viscosity values were found with the Stormer viscometer by determining the weight required to operate the rotor in the suspension at a speed of 600 R. P. M., then referring to the calibration curve characteristic of the instrument. The settling factor is determined by pouring the suspension into a 100 ml. graduated cylinder, allowing it to stand for a period of 24 hours, then measuring the percentage of clear supernatant liquor which has separated.

A drilling mud of the type described in Example 2 should have a working viscosity of at least about 20 centipoises, a gel strength of at least about 10 and a settling factor of not more than about 50 per cent of clear supernatant liquor in 24 hours.

It will be seen from the above discussion and from the specific examples that the exercise of our invention involves at least two essential steps carried out in a certain sequence (1) the clay to be suspended must be deflocculated in the liquid vehicle, with a peptizing agent preferably a small amount of sodium silicate, before the addition of any agents in substantial concentration which tend to flocculate the solids, and (2) the alkali metal silicate should then be admixed. If additional electrolytes are desired, these are added either simultaneously with or subsequent to addition of the alkali metal silicate. Step (1) may be assisted by grinding with an aqueous vehicle substantially free from flocculating agents.

While the above specific examples illustrate what we consider the best embodiments of our invention, many modifications can be made in the procedure outlined without departing from the purview of our invention.

For example, potassium silicates can be employed in our invention. It is also possible to employ the silicates in solid form. For example, soluble silicate of soda glasses, hydrous silicate of soda powders, hydrates of sodium metasilicate and sodium sesquisilicate may be used.

Further modifications of our invention which fall within the scope of the following claims will be readily apparent to those skilled in the art.

What we claim is:

1. In the manufacture of stable silicate-clay suspensions in strong alkali metal silicate solutions, the process which comprises deflocculating clay by mixing it with a dilute aqueous solution of an alkali metal silicate having deflocculating concentrations within the range of 0.1 to 10 per cent by weight, then adding sufficient additional silicate to produce a resulting viscosity of at least about 20 centipoises, sufficient clay being employed to produce a suspension settling not substantially more than about 50 per cent of clear supernatant liquor in 24 hours.

2. In the manufacture of drilling muds containing clay suspended in strong solutions of sodium silicate, the process which comprises deflocculating clay by mixing it with a dilute aqueous solution of sodium silicate having deflocculating concentrations within the range of 0.1 to 10 per cent by weight, then adding additional sodium silicate in amount sufficient to produce a viscosity of at least about 20 centipoises and mixing in additional electrolytes other than sodium silicate in concentration sufficient to produce a substantial precipitating action on any colloidal material with which the resulting suspension may be contacted, weighting materials also being added, sufficient clay being present to produce a gel strength of at least about 10 and a settling factor of not substantially more than about 50 per cent of clear supernatant liquor in 24 hours.

3. In the manufacture of stable silicate-clay suspensions in strong alkali metal silicate solutions, the process which comprises mixing clay with an aqueous solution of an alkali metal silicate sufficiently dilute to produce deflocculation of said clay and within the range of 0.1 to 10 per cent by weight, then adding at least 10 per cent by weight of additional alkali metal silicate thereby substantially increasing the viscosity of the resulting suspension, sufficient clay being present to produce a suspension settling not substantially more than about 50 per cent of clear supernatant liquor in 24 hours.

4. In the manufacture of drilling muds containing clay suspended in strong solutions of sodium silicate, the process which comprises mixing clay with an aqueous solution of sodium silicate sufficiently dilute to produce deflocculation of said clay and within the range of about 0.1 to 10 per cent by weight, then adding additional sodium silicate in amount sufficient to produce a viscosity of at least about 20 centipoises, sufficient clay being present to produce a gel strength of at least about 10 and a settling factor of not substantially more than about 50 per cent of clear supernatant liquor in 24 hours.

JAMES G. VAIL.
CHESTER LEON BAKER.